United States Patent [19]

Nuesmeyer et al.

[11] Patent Number: 5,357,877
[45] Date of Patent: Oct. 25, 1994

[54] FEED FOR PARTICULATE BURNERS

[76] Inventors: David L. Nuesmeyer, N. 5530 Cannon, Spokane, Wash. 99205; Gary W. Brondt, 16220 S. Sherman Rd. #27, Cheney, Wash. 99004

[21] Appl. No.: 31,962

[22] Filed: Mar. 16, 1993

[51] Int. Cl.$^5$ ............................................... F23K 3/10
[52] U.S. Cl. .................... 110/108; 110/102; 110/101 C; 110/115; 414/158; 414/179
[58] Field of Search ............ 110/108, 115, 101 C, 110/102, 233; 414/158, 167, 179, 187, 195, 199

[56] References Cited

U.S. PATENT DOCUMENTS

| | | | |
|---|---|---|---|
| 1,007,861 | 11/1911 | Gmeindl, Sr. et al. | |
| 1,945,850 | 2/1934 | Filmer . | |
| 2,134,887 | 11/1938 | Panke . | |
| 2,146,469 | 2/1939 | Foster . | |
| 3,610,182 | 10/1971 | Stockman | 110/115 |
| 4,549,490 | 10/1985 | Wetzel et al. | 110/102 X |
| 4,619,209 | 10/1986 | Traeger et al. | 110/110 |
| 4,646,637 | 3/1987 | Cloots | 110/245 |
| 4,941,414 | 7/1990 | Carlson | 110/108 |
| 5,018,455 | 5/1991 | Harman | 110/110 |
| 5,133,266 | 7/1992 | Cullen | 110/233 |
| 5,151,000 | 9/1992 | Geraghty et al. | 414/187 |

FOREIGN PATENT DOCUMENTS

| | | |
|---|---|---|
| 380197 | 11/1923 | Fed. Rep. of Germany . |
| 485979 | 10/1929 | Fed. Rep. of Germany ...... 414/195 |
| 223797A1 | 3/1984 | Fed. Rep. of Germany . |

*Primary Examiner*—Edward G. Favors
*Attorney, Agent, or Firm*—Wells, St. John, Roberts, Gregory & Matkin

[57] ABSTRACT

A particulate delivery system is disclosed for particulate burners in which a hopper is provided for supplying particulate fuel to a hopper discharge opening. A rotating turntable is provided below the hopper discharge opening and includes at least one and preferably a plurality of flexible resilient vanes rotating with the turntable. A wall partially encircles the vanes and is closed on its bottom end by the upper surface of the turntable. The wall includes a lateral discharge opening that facilitates controlled discharge of the particulate fuel over the peripheral edge of the turntable. A chute receives the discharged particulate material, and drops it into a burn pot of the associated particulate burner.

27 Claims, 4 Drawing Sheets

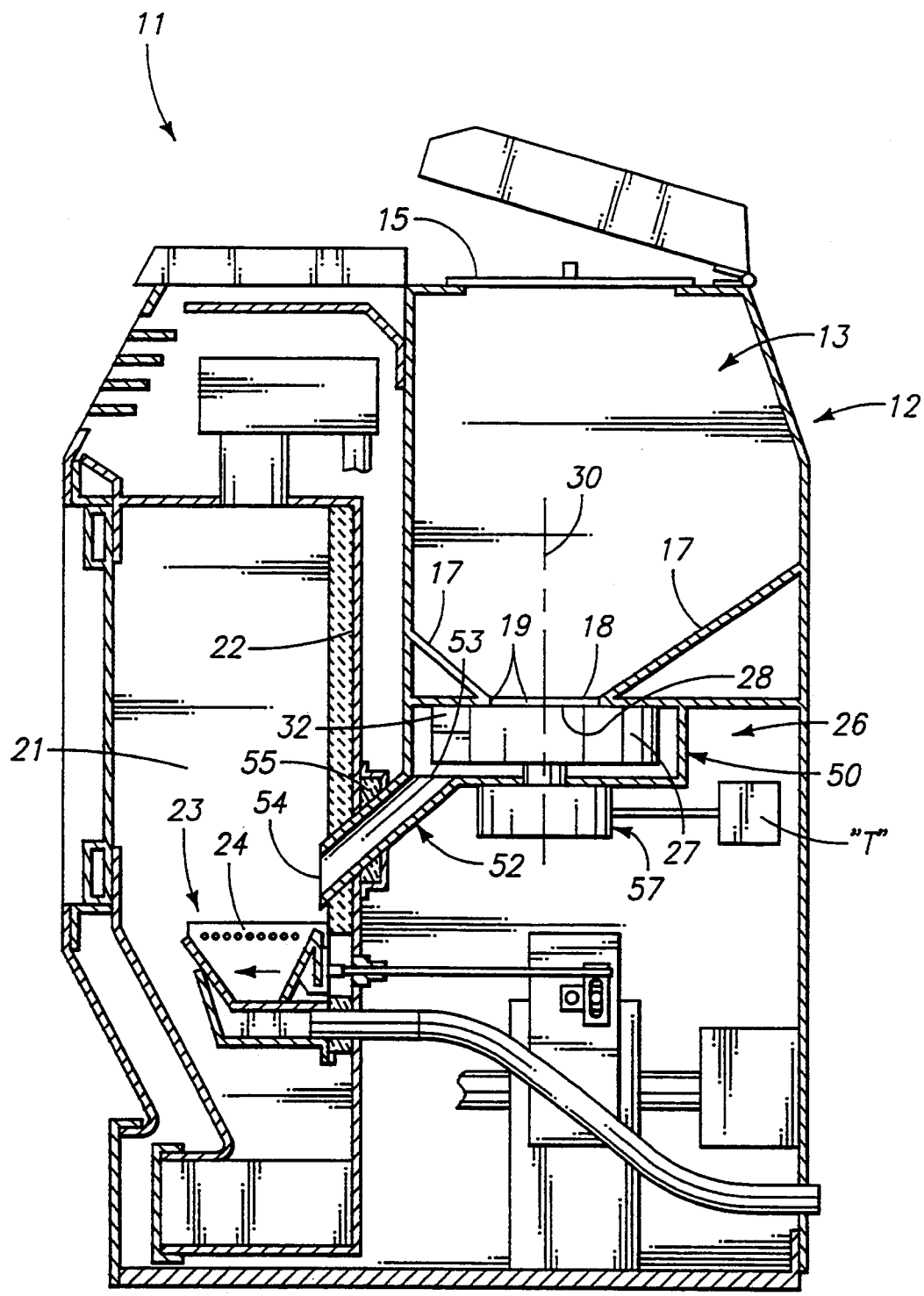

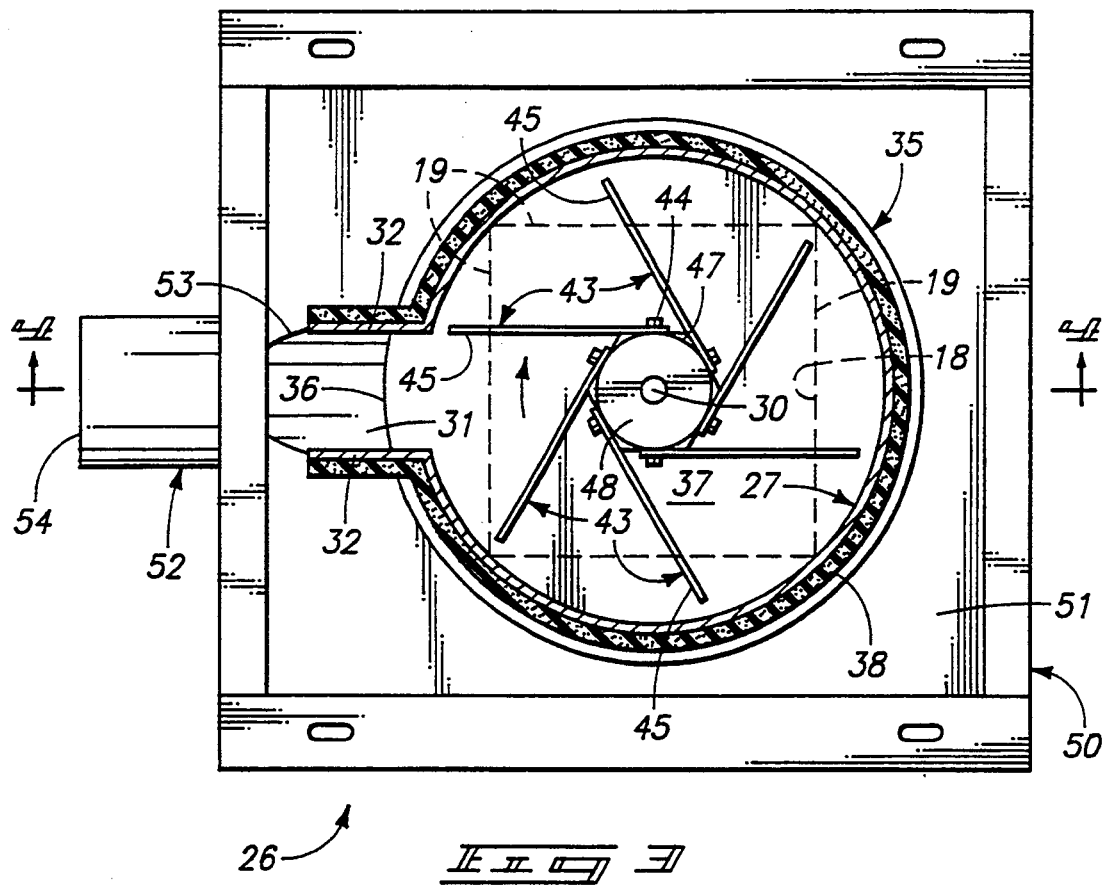
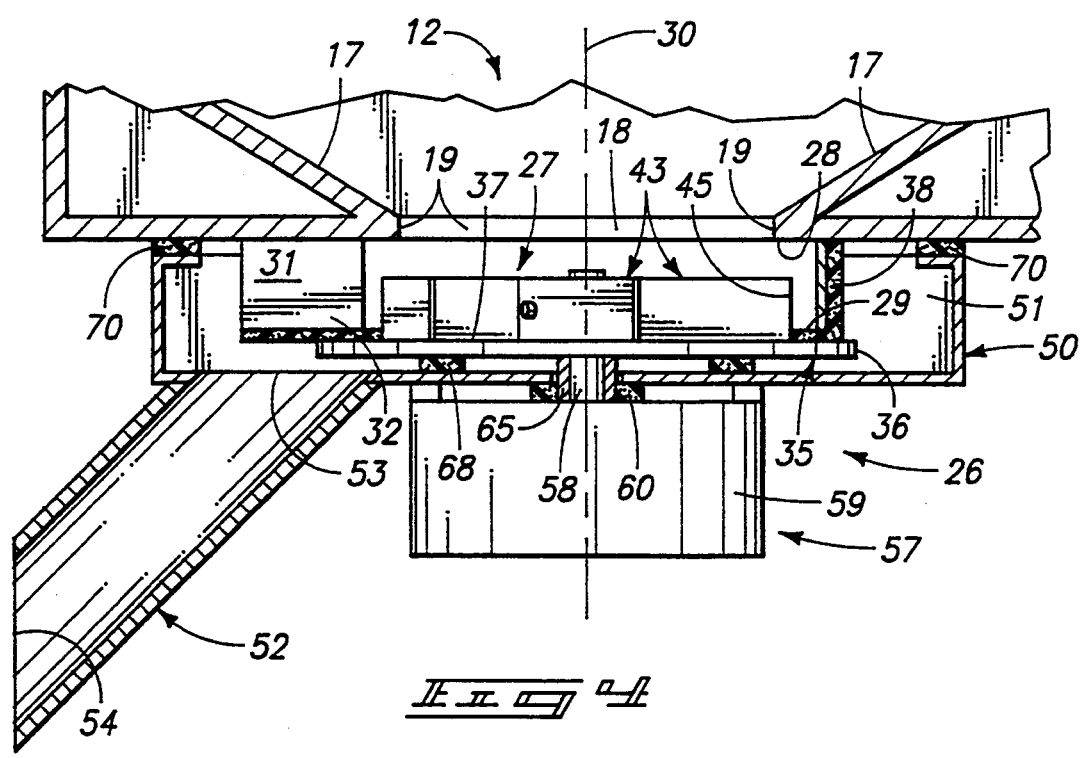

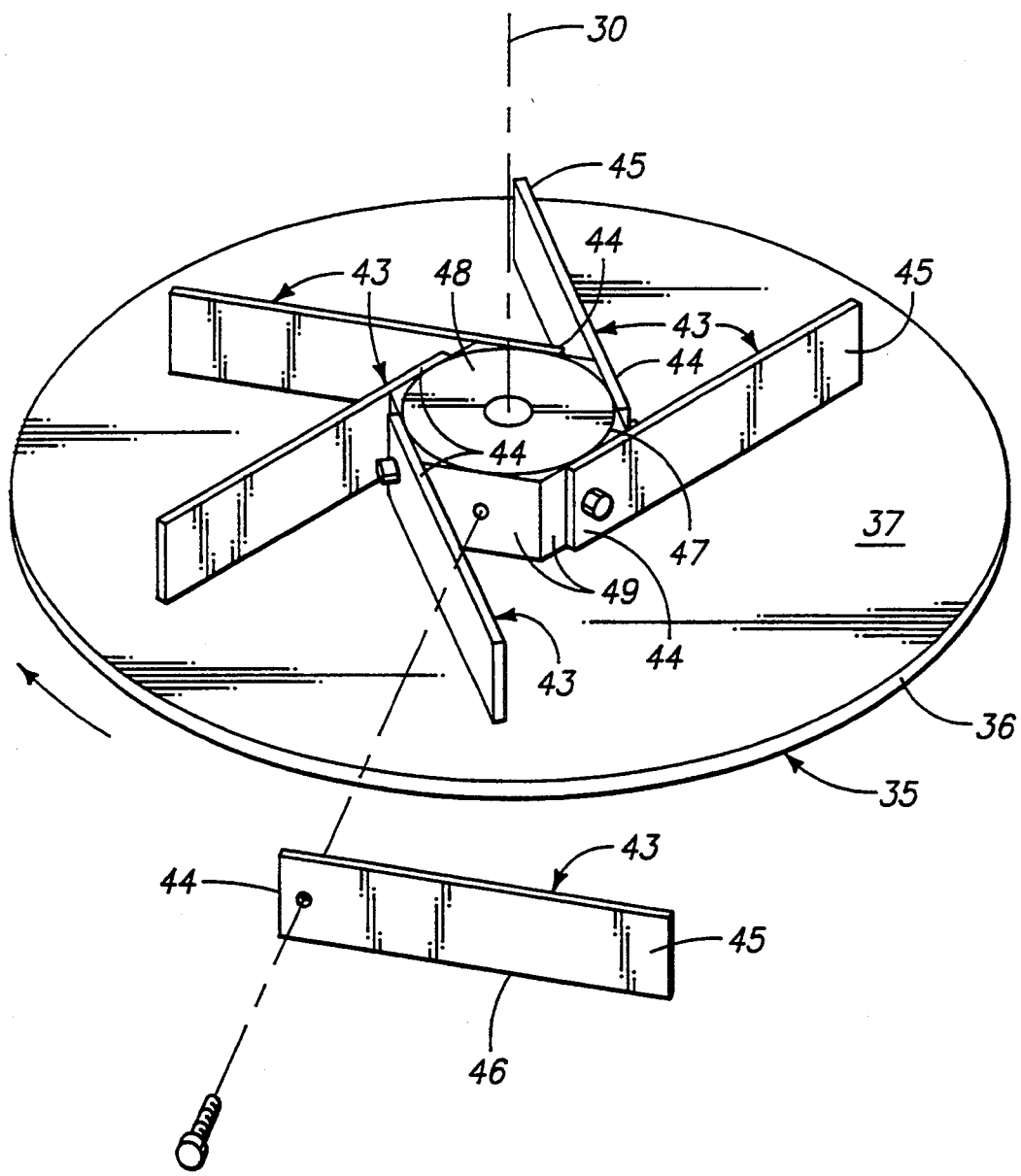

FEED FOR PARTICULATE BURNERS

TECHNICAL FIELD

The present invention relates to feeding of particulate fuel to a particulate burner.

BACKGROUND OF THE INVENTION

Particulate burners, such as "pellet" stoves, typically burn the particulate material in relatively small quantities. The pellet material is usually fed from a hopper containing a large quantity of pellets. Some form of metering device is provided between the hopper and burner in order to control feed of pellets to the burner. The feed mechanism is typically controlled in speed or for timed intervals in order to control the amount of pellets fed. Such varied feed will affect heat output for the associated burner. Several problems have been recognized with such known forms of feed systems.

Many conventional pellet feed systems employ an auger for feeding the particulate fuel laterally from a hopper. These systems have long been known to jam or bind against the fuel particulates, especially if the particulate material is not uniform in size and quality. "Jamming" can cause damage to the feeding system, or cause frustrating down time for the pellet burner while the auger path is cleared. "Burn back" into the auger area has also been experienced.

Jamming is also a problem with other forms of metering wheels and other arrangements where it is possible for a piece of particulate material to be wedged between the metering device and a wall of the housing enclosing the metering arrangement.

Another problem with prior forms of particulate metering systems is that they cannot be relied upon to deliver fines along with the fuel. This is especially true where precautions are taken to avoid the jamming problem discussed above. If tolerances are left slack to avoid jamming, the fines tend to collect in the designed voids and are not delivered to the combustion area.

A still further problem is encountered in break up of the particulate material as it is delivered. This is especially true of high torque auger systems that avoid the jamming situation by forcibly rotating the auger or other feed mechanism to deliver the material. Jamming is eliminated by crushing any particulate material that would otherwise jam the system. This creates more fines and increases another problem that is common to many forms of feed mechanism-noise.

A still further problem realized in many forms of particulate feed mechanisms is the amount of time between hopper loading and the actual time fuel is delivered to the combustion area when the feed mechanism starts from an empty condition. This is particularly true of auger feeders where the slowly moving augers take substantial time to deliver fuel from a newly loaded hopper. This can be inconvenient and frustrating, especially in cold conditions where the burner has run out of fuel and the fire must be restarted.

The present invention, as will be understood below, eliminates the above problems by providing a feed system in which particulate fuel is delivered from a hopper to a burn pot in an accurate, reliable, quickly-responsive, quiet, and jam-free manner.

BRIEF DESCRIPTION OF THE DRAWINGS

A preferred embodiment of the invention is described below with reference to the accompanying drawings, which are briefly described below.

FIG. 2 is a cross-sectional view through the burner showing the present particulate delivery system incorporated therein;

FIG. 3 is an enlarged top plan view of a wall and turntable arrangement for the present system;

FIG. 4 is a sectional view taken substantially along line 4—4 in FIG. 3 with portions of the hopper also shown for clarity; and FIG. 5 is an exploded perspective view of a preferred turn table and associated elements.

DETAILED DESCRIPTION OF THE PREFERRED EMBODIMENTS

Figure 1:
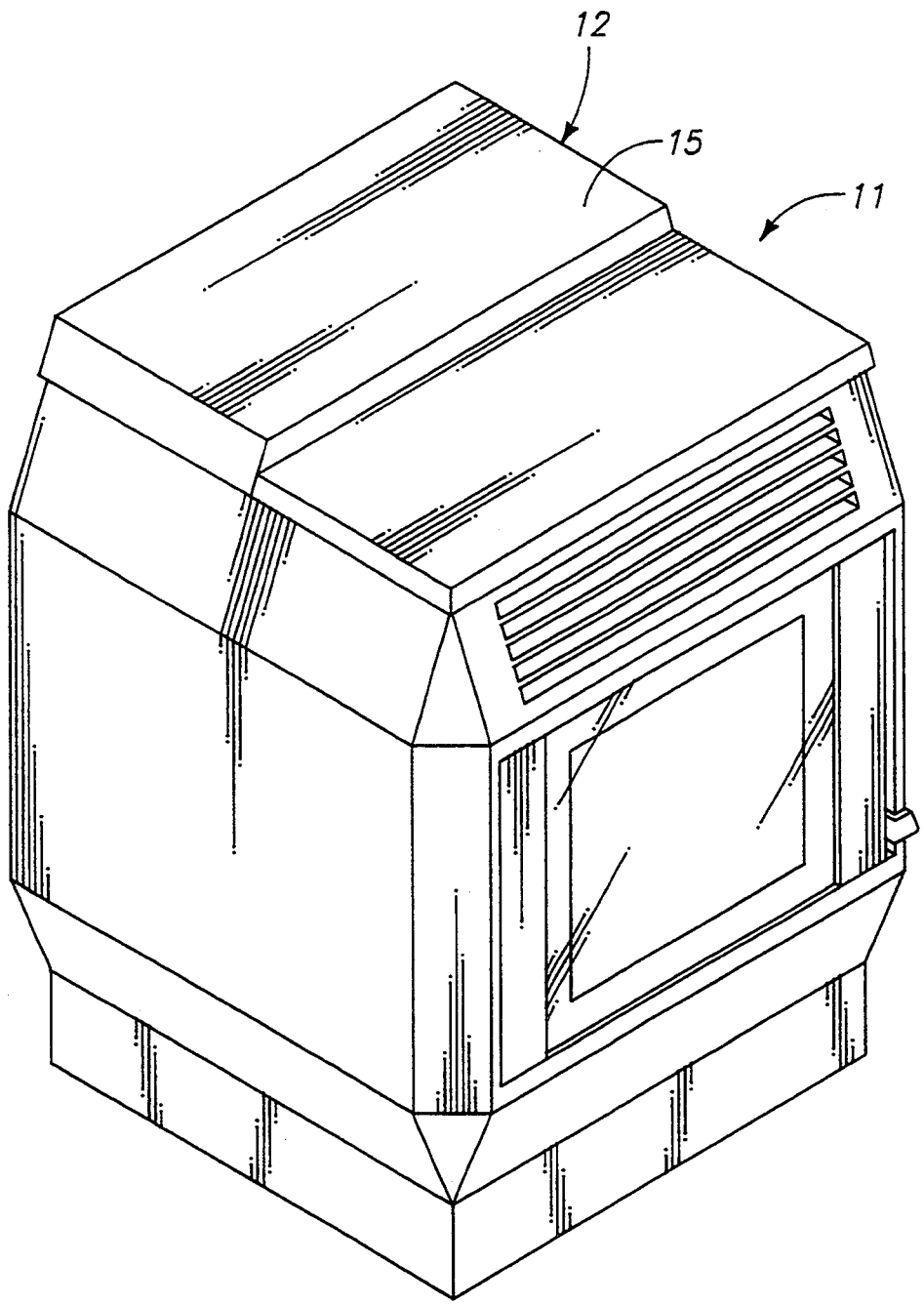
FIG. 1 is a perspective view of a particulate burner of the type that may be used to incorporate the present delivery system.

This disclosure of the invention is submitted in furtherance of the constitutional purposes of the U.S. Patent Laws "to promote the progress of science and useful arts" (Article 1, Section 8).

The present invention is intended to use with particulate burners. An example of such a burner is generally indicated in FIG. 1 of the drawings by the reference numeral 11. Burner 11 is preferably a form of a particulate burner used to receive and burn pelletized biomass fuel for heating purposes. However, it is understood that the present feed system might be used with other forms of burners in which a particulate material such as pelletized biomass fuel, coal, or other loose combustible material such as dried corn, sawdust, etc. is burned. While such materials may find utility with the present feeder, the presently preferred application is with pelletized biomass fuel.

Such fuel is loosely received within a hopper 12 (FIG. 2) having hopper walls 13 that lead downwardly and converge, from top ends defining the hopper opening and selectively covered by a lid 15, to a hopper bottom 17. A hopper discharge opening 18 is defined along the hopper bottom 17 for discharging particulates by gravity. In a preferred example, the hopper discharge opening is defined along the hopper bottom 17 by edges 19 that define a square.

The hopper 12 may be substantially integrated with the particulate burner 11, as may be the burner firebox 21 (FIG. 2). Firebox 21 may take any convenient form, but will include at least one firebox wall 22 that will provide support for burn pot 23. The burn pot 23 includes an upwardly open top end 24 for receiving combustible particulates in an "over feed" configuration.

The present particulate delivery system 26 is provided between the hopper 12, the firebox 21, and burn pot 23. The particulate delivery system 26 includes features of the present invention by which quantities of the particulate fuel are delivered at a selected rate from the hopper, and are fed by gravity to the burn pot 23.

The present particulate delivery system 26 includes a wall 27 in a partial ring configuration. The wall extends from a top edge 28 axially to a bottom edge 29. (FIG. 4) The wall 27 is formed substantially about a vertical center axis 30. Substantially circular or cylindrical portions of the wall 27 lead to a lateral discharge opening 31 that is spaced radially outward of the hopper discharge opening 18 with respect to the center axis 30.

The wall discharge opening 31 is defined by at least one but preferably a pair of discharge abutment walls 32 (FIG. 3) extending substantially radially from the wall 27. The discharge abutment walls 32 lead outwardly from the circular or cylindrical portion of the wall 27.

The wall 27 is attached at its top edge 28 to the hopper bottom, directly below the hopper discharge opening 18. It substantially circumscribes the opening 18 such that all edges 19 of the opening 18 are located within the wall 27.

Turntable 35 (FIGS. 3–5) is positioned to rotate immediately below the station wall 27. Turntable 35 is comprised of a relatively flat plate that extends to a substantially circular peripheral edge 36. It includes an upwardly facing surface 37 that is positioned below the bottom edge 29 of the wall 27.

The effective diameter of the turntable 35 is at least equal to the diameter of the wall 27 in relation to tile central axis 30. Preferably, the turntable is somewhat larger than the hopper discharge opening 18. The turntable edge 36 thus projects outward beyond the hopper discharge opening 18.

The dimensions of the wall discharge opening 31, including: its axial height (from the turntable top surface to the hopper bottom); radial depth (the radial space between the peripheral turntable edge 36 and the upwardly and inwardly spaced hopper opening edge 19); and tangential width (with respect to the center axis) may vary according to the nature of the particulates being fed, their lengths, width and texture.

A seal 38 (FIGS. 3, 4) is provided on the wall 27 and discharge abutment walls 32, between the upper surface 37 of the turntable and the bottom edges of the walls. The seal 38 provides a dust seal between the wall and turntable, yet slidably engages the turntable 35 such that the turntable 35 is relatively free to rotate about its own vertical turntable axis.

The turntable axis and center axis 30 are substantially coincidental or coaxial in the preferred form. The wall 27 and turntable 35 are thus substantially centered with respect to one another.

The turntable 35 is mounted for rotation about the center axis 30 in order to receive and influence outward migration of particulates toward the discharge opening 31. The turntable may function alone in this capacity. However, in the preferred form (FIGS. 3 through 5), the turntable 35 includes at least one vane 43 for assisting radial outward migration of particulates from within wall 27 and on the turntable 35.

As exemplified in the drawings, several individual vanes 43 are disclosed for the above purpose. Each may advantageously be substantially identical to the remaining vanes. A description of one vane will thus be sufficient for the remaining vanes.

The vanes 43 in a preferred form are formed of elongated strips of resilient material such as "blue clock steel" of approximately 25 gauge to enable resilient flexure along the vane length.

Each vane 43 includes an inward end 44 and an outward end 45. The bottom edge 46 joins the inward and outward ends 44, 45 adjacent to the upwardly facing surface 37 of the turntable 35. The vanes 43 are releasably mounted near their inward ends 44, substantially tangential to a reference circle 47 (FIG. 3).

The reference circle 47 is defined by a hub 48 having external tangential flat surfaces 49 for receiving the individual vanes. In the example shown, the hub 48 includes hexagonal vane mounting surfaces 49 (FIG. 5) providing mounting surfaces for six vanes.

It is noted that the vanes 43 are mounted only at their inward ends 44 to the hub 48. The remainder of the individual vane lengths extend outwardly of the hub 48, free of the turntable upper surface 37.

The vanes 43 are capable of deflection along their length dimensions above the turntable surface 37. This is a feature that facilitates use of the vanes 43 to agitate and assist outward migration of particulates on the turntable 35; but yet avoids binding between the vane ends 45 and the internal or inward facing surfaces of the stationary wall 27.

The vanes 43, as shown in FIG. 3 are arranged in a "pinwheel" configuration. The inward ends 44 are situated in advance of the outward ends 45 with respect to a preferred rotational direction (arrow FIGS. 3 and 5). Vanes 43 in this orientation provide a sweeping effect as the turntable 35 is rotated. The rearwardly swept vanes 43 will deflect inwardly should an otherwise binding obstruction occur within the particulates received from the hopper 12.

The turntable 35 and vanes 43 are mounted to the hopper bottom by a base generally shown at 50 (FIGS. 2–4), and preferably comprising a housing 51 that substantially encloses the above components. A substantially airtight seal 70 is situated between the open upper end of the housing and the bottom end of the hopper 12.

The housing 51 mounts a chute 52 that leads angularly downward from an open top end 53 to a bottom end 54. The open upward end 53 is situated adjacent the lateral discharge opening 31 of the wall 27. Open end 53 is positioned directly elevationally below the discharge opening 31 to receive particulate materials during operation of the present delivery system.

The chute 52 may take any number of configurations or directions to direct the falling particulates downwardly. In a preferred form shown, the chute extends downwardly through an annular, substantially airtight seal 55 on the fire box wall 22 (FIG. 2) to the bottom chute end 54. End 54 is positioned within the firebox to drop the particulate material into the burn pot 23.

As shown, the chute 52 is straight and angularly inclined from between the opposed open ends 53, 54. In other embodiments, the chute 52 may be curved or otherwise arranged to direct the falling materials toward a desired discharge point. In other conceivable configurations, it is possible that no chute 52 would be required, with the particles instead simply dropping from the lateral discharge opening 31 directly into a receptacle below.

A driver, generally shown at 57, is mounted to the base 50 for rotating the turntable 35, hub 48, and vanes 43 on a substantially vertical turntable axis. Particulates within the wall and on the upwardly facing rotating surface 37 will migrate outwardly and eventually through the lateral discharge opening 31. The outwardly migrating particulates will eventually drop off the peripheral edge 36 of the turntable 35 at the lateral discharge opening 31, and into the chute 52 or whatever receptacle is provided below.

The driver 57, in a preferred form (FIG. 4), includes a gear motor 59 mounted to the base 50. Gear motor 59 includes a drive shaft 58 passing through a turntable support bearing 65.

The turntable 35, hub 48, and the vanes 43 are mounted to the shaft 58 for rotation therewith about a substantially vertical shaft axis (which is preferably coincidental or coaxial with the substantially vertical center axis 30).

The gear motor 59 in a preferred form is selected and appropriately controlled to rotate the drive shaft 58 at a fixed rate of rotation, for example approximately one revolution per minute. Each revolution is preferably divided in increments under control by commercial timing control components diagrammatically shown at "T" in FIG. 2, such that "on" times are lengthened for higher feed rates and reduced for lower feed rates. Specific controls are not shown, but are believed to be well within the skill of control circuit designers.

The gear motor 59, as shown in FIG. 4, is mounted to the housing 51 directly below the turntable. A substantially airtight seal 60 is provided about shaft 58 and between the gear motor 59 and the housing 51. A seal 68 is also positioned between the bottom surface of the turntable 35 and housing 51 to provide a substantially dust tight seal for bearing 65 which supports turntable 35 and facilitates the smooth, quiet operation of the delivery system.

From the above description, operation of the present invention may now be easily understood. Prior to operation, mounting of the present system occurs, preferably along with construction of the associated particulate burner. Installation may occur using ordinary tools and construction techniques.

Prior to operation, the burner hopper is at least partially filled with particulate fuel. The loose fuel particles will flow by gravity downward through the hopper discharge opening 18.

Depending upon the nature of the driver 57, the appropriate control mechanisms, and an energy source (such as electrical power) are connected to facilitate operation. The driver is then turned on and a feed rate is selected corresponding to the burn rate desired.

The fuel drops by gravity from the hopper onto the turntable and into the area confined by the wall 27. The particulate material will therefore substantially fill the interior portion of the wall 27. However, by reason of: (a) the radial spacing between the peripheral turntable edge 36 and the upwardly and inwardly spaced hopper opening edge 19; (b) the vertical (axial) spacing between the turntable 35 and bottom surface of the hopper; and (c) the width (tangential) of the lateral discharge opening 31; the particulate material will not automatically "self-feed" through the lateral discharge opening 31 without aid of the rotating turntable.

During "on" time, the motor is activated to rotate the turntable 35 and the vanes 43. The rate of feed may be selectively controlled by appropriate timing control mechanisms which turn the driver "on" and "off" through selected increments of time. This enables the driver 57 to consistently rotate the turntable and vanes at a constant speed and vary the feed rate simply by selectively adjusting increments of "on" and "off" time. The feed rate thus changes while the speed of the turntable (when rotating) remains constant.

As driver 57 rotates the turntable 35 and the vanes 43, the particulates stacked on the turntable and situated within the wall 27 will be carried or agitated in a circular motion by the slowly rotating turntable and the resilient vanes. The particulates will slowly migrate outward to the wall 27 and eventually will work their way through the lateral discharge opening 31 to drop off the peripheral edge 36 of the turntable 35 and slide down the chute 52.

Particulate migration is caused, not by centrifugal force or by the vanes "throwing" the particulates outward, but by the weight of the stack of material above and by the natural tendency for the material to migrate outwardly on the rotating turntable 35.

Particulates on the upwardly facing surface of the turntable 35 will migrate outwardly and toward the wall 27 and the lateral discharge opening 31 and will eventually drop off the peripheral edge 36 of the turntable. The rotating turntable and vanes simply encourage outward particulate migration and prevent potential "bridging" or accumulation of material on the turntable at locations spaced opposite to the lateral discharge 31. Feed is thus consistent.

During incremental rotation, the individual vanes assist the action of the turntable by "sweeping" the material being fed from above through the hopper discharge 18. It is pointed out that the sweeping action takes place along the upward side of the vane edges as opposed to the bottom edges adjacent the turntable. This is because the vanes rotate in unison with the upper surface 37 of the turntable 35.

The wall 27, being stationary, is a potential area where material might bind between the vanes 43 and the stationary wall surface. However, the vanes will easily flex or deflect rearwardly to avoid jamming the device. This feature therefore facilitates selection of a low torque power drive system since the pellets are not forced and the feed is at least partially controlled by gravity, using the weight of the particulate materials within the hopper.

The driver 57 requires minimal power for operation and may be adequately insulated against sound. It will therefor operate very quietly, especially in comparison with other forms of feed mechanisms.

The hopper, being open at the bottom end and exposing the hub and vanes, promotes maintenance and cleaning procedures.

Further, delivery of fuel from the hopper to the fire is quickly achieved due to the close proximity of the particulate supply to the turntable and vanes, so fuel particles are quickly delivered from the hopper to facilitate starting and maintaining burning conditions.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A particulate delivery system for particulate burners, comprising:
   a hopper for receiving particulate fuel and including a hopper bottom with a hopper discharge opening for discharging particulate fuel by gravity therefrom;
   a wall including a top edge and a bottom edge and formed about a substantially vertical center axis;
   the top edge of the wall being mounted beneath and against the hopper bottom about the discharge opening and extending downwardly therefrom to the bottom edge;

wherein the wall includes a lateral discharge opening spaced radially outward of the hopper discharge opening with respect to said center axis;

a turntable including a peripheral edge and an upwardly facing surface for receiving and movably supporting particulates received from the hopper through the discharge opening therein;

a base for mounting the turntable to the hopper bottom beneath the hopper discharge opening and with the upwardly facing surface of the turntable being positioned beneath and adjacent to the bottom edge of the wall;

a driver for mounting and rotating the turntable with respect to said center axis, such that particulates on the upwardly facing surface will migrate outwardly and toward the wall and the lateral discharge opening and will eventually drop off the peripheral edge of the turntable at the lateral discharge.

2. The particulate delivery system as claimed by claim 1 wherein the wall is substantially circular and centered on the center axis; and wherein the turntable is substantially circular and centered on the center axis, and includes a diameter larger than that of the wall relative to the center axis.

3. The particulate delivery system as claimed by claim 1 wherein at least one vane is on the turntable for assisting outward migration of particulates on the turntable.

4. The particulate delivery system as claimed by claim 1 wherein at least one vane is mounted on the turntable for assisting outward migration of particulates on the turntable and wherein the at least one vane is elongated and includes an inward end and an outward end, and wherein the inward end is mounted to the turntable adjacent the center axis and the outward end is inwardly adjacent the wall.

5. The particulate delivery system as claimed by claim 1 wherein at least one vane is mounted on the turntable for assisting outward migration of particulates on the turntable and wherein the at least one vane is elongated and resilient along its length, and includes an inward end and an outward end, and wherein the inward end is mounted to the turntable adjacent the center axis and the outward end is inwardly adjacent the wall.

6. The particulate delivery system as claimed by claim 1 wherein at least one vane is mounted on the turntable for assisting outward migration of particulates on the turntable and wherein the at least one vane is mounted to the turntable substantially tangential to a reference circle formed on the center axis.

7. The particulate delivery system as claimed by claim 1 wherein at least one vane is mounted on the turntable for assisting outward migration of particulates on the turntable and wherein the at least one vane is mounted to the turntable substantially tangential to a reference circle formed on the center axis;

wherein the at least one vane is elongated, extending from an inward end to an outward end; and wherein the at least one vane is resilient along its length.

8. The particulate delivery system as claimed by claim 1 further comprising a seal between the upper surface of the turntable and the bottom edge of the wall.

9. The particulate delivery system as claimed by claim 1 further comprising paired discharge abutment walls on the wall at the discharge opening of the wall, extending substantially radially from the wall and at least to the peripheral edge of the turntable.

10. The particulate delivery system as claimed by claim 1 wherein the driver is operable to rotate the turntable in a preferred rotational direction about the center axis;

at least one vane is mounted on the turntable for assisting outward migration of particulates on the turntable;

wherein the at least one vane includes an inward end and an outward end;

wherein the inward end of the at least one vane is mounted to the turntable in advance of the outward end with respect to the preferred rotational direction substantially tangential to a reference circle formed on the center axis.

11. The particulate delivery system as claimed by claim 1 wherein the driver is operable to rotate the turntable in a preferred rotational direction about the center axis;

at least one vane is mounted on the turntable for assisting outward migration of .particulates on the turntable;

wherein the at least one vane is elongated and resilient along its length;

wherein the at least one vane includes an inward end and an outward end;

wherein the inward end of the at least one vane is mounted to the turntable in advance of the outward end with respect to the preferred rotational direction.

12. The particulate delivery system as claimed by claim 1 further comprising an inclined chute mounted to the base and including an open top end downwardly adjacent the lateral discharge opening of the wall, and a downwardly disposed open bottom end.

13. The particulate delivery system as claimed by claim 1 wherein the hopper discharge opening is substantially square and wherein the wall substantially circumscribes the hopper discharge opening.

14. The particulate delivery system as claimed by claim 1 wherein at least one vane is mounted on the turntable for assisting outward migration of particulates on the turntable; and wherein the at least one vane includes an inward end mounted to the turntable and an outward end positioned radially with respect to the central axis between the hopper opening and the peripheral edge of the turntable.

15. The particulate delivery system as claimed by claim 1 wherein at least one vane is mounted on the turntable for assisting outward migration of particulates on the turntable; and wherein the at least one vane is comprised of:

an elongated strip of resilient material extending between an inward end and an outward end;

a bottom edge extending between the inward and outward ends; and wherein the elongated strip is mounted at its inward end to the turntable adjacent the center axis, and with the bottom edge slidably engaging the upwardly facing surface of the turntable.

16. The particulate delivery system as claimed by claim 1 wherein the driver includes a drive shaft mounting the turntable for rotation in a prescribed direction at a fixed rate.

17. The particulate delivery system as claimed by claim 1 wherein the driver includes a gear motor with a drive shaft mounting the turntable for incremental rotation in a prescribed direction at a fixed rate.

18. A particulate burner, comprising:
a hopper for receiving particulates and including a bottom wall with a hopper discharge opening therein for discharging particulates by gravity therefrom;
a firebox;
a burn pot within the firebox;
a wall including a top edge and a bottom edge and formed about a substantially vertical center axis;
the top edge of the wall being mounted beneath and against the hopper bottom about the hopper discharge opening and extending downwardly therefrom to the bottom edge;
wherein the wall includes a lateral discharge opening spaced radially outward of the hopper discharge opening with respect to said center axis;
a turntable including a peripheral edge and an upwardly facing surface for receiving and movably supporting particulates received from the hopper through the discharge opening therein;
a base mounting the turntable with the upwardly facing surface slidably engaged against the bottom edge of the wall;
a driver for mounting and rotating the turntable with respect to said center axis, such that particulates on the upwardly facing surface will migrate outwardly and toward the wall and the lateral discharge opening and will eventually drop off the peripheral edge of the turntable at the lateral discharge; and
an inclined chute mounted to the base and including an open top end downwardly adjacent the lateral discharge opening of the wall, and a downwardly disposed open bottom end positioned above the burn pot for delivering particulates thereto.

19. A particulate burner as claimed by claim 18 wherein the wall is substantially circular and centered on the center axis; and
wherein the turntable is substantially circular and centered on the center axis, and includes a diameter larger than that of the wall through the center axis.

20. A particulate burner as claimed by claim 18 further comprising at least one vane on the turntable;
said vane being elongated and including an inward end and an outward end; and
wherein the inward end is mounted to the turntable adjacent the center axis and the outward end is inwardly adjacent the wall.

21. A particulate burner as claimed by claim 18 further comprising:
at least one vane on the turntable;
said vane being elongated and including an inward end and an outward end;
wherein the inward end is mounted to the turntable adjacent the center axis and the outward end is inwardly adjacent the wall;
wherein the vane is resilient along its length, and wherein the inward vane end is mounted to the turntable adjacent the center axis and the outward end is inwardly adjacent the wall.

22. A particulate burner as claimed by claim 18 further comprising a discharge abutment wall on the wall at the discharge opening of the wall, extending substantially radially from the wall and at least to the peripheral edge of the turntable.

23. A particulate burner as claimed by claim 18 wherein the driver is operable to rotate the turntable in a preferred rotational direction about the center axis; and further comprising:
at least one vane on the turntable;
wherein the vane includes an inward and an outward end;
wherein the inward end is mounted to the turntable adjacent the center axis and the outward end is inwardly adjacent the wall;
wherein the vane is elongated and resilient along its length; and
wherein the inward end of the vane is mounted to the turntable in advance of the outward end with respect to the preferred rotational direction.

24. A particulate burner as claimed by claim 18 wherein the hopper discharge opening is substantially square and wherein the wall substantially circumscribes the hopper discharge opening.

25. A particulate burner as claimed by claim 18 further comprising:
a vane on the turntable;
wherein the vane is comprised of:
an elongated strip of resilient material extending between an inward end and an outward end;
a bottom edge extending between the inward and outward ends; and
wherein the elongated strip is mounted at its inward end to the turntable adjacent the center axis, and with the bottom edge slidably engaging the upwardly facing surface of the turntable.

26. A particulate burner as claimed by claim 18 wherein the driver includes a drive shaft mounting the turntable for rotation in a prescribed direction at a fixed rate.

27. A particulate delivery system for a particulate burner, having a hopper for receiving particulate fuel and including a hopper bottom with a hopper discharge opening for discharging particulate fuel by gravity therefrom comprising;
a wall including a top edge and a bottom edge and formed about a substantially vertical center axis;
the top edge of the wall being adapted to be mounted beneath and against the hopper bottom about the discharge opening and extending downwardly therefrom to the bottom edge;
wherein the wall includes a lateral discharge opening spaced radially outward of the hopper discharge opening with respect to said center axis;
a turntable including a peripheral edge and an upwardly facing surface for receiving and adapted to movably support particulates received from the hopper through the discharge opening therein;
a base mounting the turntable with the upwardly facing surface positioned downwardly adjacent the bottom edge of the wall;
a driver mounted to the base, for rotating the turntable on a substantially vertical turntable axis, such that particulates on the upwardly facing surface will migrate outwardly and toward the wall and the lateral discharge opening and will eventually drop off the peripheral edge of the turntable at the lateral discharge; and
at least one vane on the turntable for assisting outward migration of particulates on the turntable.

* * * * *